United States Patent [19]

Tanzawa et al.

[11] Patent Number: 5,769,998

[45] Date of Patent: Jun. 23, 1998

[54] METHOD FOR FORMING AGGREGATION BODY BY THERMOCOMPRESSION

[75] Inventors: Shinji Tanzawa, Tokyo; Katsutoshi Sasagawa; Mitsumasa Horikawa, both of Aichi; Yasuo Tamura; Koichi Kimura, both of Kanagawa, all of Japan

[73] Assignee: Koyo Sangyo Co., Ltd., Tokyo, Japan

[21] Appl. No.: 516,295

[22] Filed: Aug. 17, 1995

[30] Foreign Application Priority Data

Aug. 19, 1994 [JP] Japan .................................. 6-195489

[51] Int. Cl.⁶ ...................................................... B29J 5/02
[52] U.S. Cl. ........................ 156/285; 156/228; 156/264; 156/312; 264/101; 264/109
[58] Field of Search ..................... 156/228, 242, 156/245, 256, 264, 289, 297, 312, 285, 286, 62.8; 264/101, 109

[56] References Cited

U.S. PATENT DOCUMENTS 3,891,738  6/1975  Shen ......................................... 264/101
4,396,451  8/1983  Yeager .................................... 156/285
4,517,147  5/1985  Taylor et al. ........................... 156/285
4,818,321  4/1989  Shimizu et al. ........................ 156/254

*Primary Examiner*—Michael W. Ball
*Assistant Examiner*—Michael A. Tolin
*Attorney, Agent, or Firm*—McAulay Fisher Nissen Goldberg & Kiel, LLP

[57] ABSTRACT

A workpiece comprising an aggregation body of platelike articles, sheet-like whose fibers have been opened by rolling, stick-like articles formed by finely tearing them from a single plate, flake-like articles, strand-like articles or the like is inserted between an upper heat plate 12 and a lower heat plate 13 of a heating press apparatus 10. A spacer 14 for surrounding the workpiece and determining the final thickness of the product is arranged on one or both of the heat plates before or after the insertion of the workpiece 11. The workpiece is compressed by the upper heat plate 12 and the lower heat plate 13 to thereby form an air tight compartment made of the upper heat plate 12, the lower the plate 13 and the spacer 14, and containing the workpiece. The air tight compartment is decompressed by vacuum for a predetermined period, then steam or heated gas is jetted onto the workpiece in the compressed air tight compartment. Preferably, a decompressing is ensured again after jetting the steam or the heated gas, resulting in the final thermocompressed aggregation product.

8 Claims, 5 Drawing Sheets

10 : heating press apparatus
11 : workpiece
12 : upper heat plate
13 : lower heat plate
14 : spacer
14a : inner face of spacer
14b : hole 10 : heating press apparatus
11 : workpiece
12 : upper heat plate
13 : lower heat plate
14 : spacer
14a : inner face of spacer
14b : hole

METHOD FOR FORMING AGGREGATION BODY BY THERMOCOMPRESSION

BACKGROUND OF THE INVENTION

The present invention relates to a method for forming an aggregation body by means of thermocompression, during which steam or heated gas is jetted into the thermocompression form. The aggregation body can be composed of single plates, sheet-like articles whose fibers have been opened by rolling, stick-like articles formed by finely tearing them from a single plate, flake-like articles, strand-like articles or sheet-like article of arranged ligneous stalks resulting in the production of a plywood, a laminated veneer lumber (LVL), a particle board, a strand board, a fiber board, a ligneous stalk laminated body or the like.

In particular, the present invention relates to a thermocompression method capable of producing an aggregation body in a shorter time than previous thermocompression methods by jetting a pressurized and heated steam or gas into the thermocompression apparatus.

The "workpiece" in this specification means an aggregation body and the like before the pressing. Also, "product" means an aggregation body and the like after the pressing.

Up to now, plywood, particle board, fiber board and like products were made by coating an adhesive on surfaces of a plurality of lignocellulose materials in the form of single plates, chips of wood or fibers, thereafter piling them up. This workpiece was then placed between a pair of heat plates of a heating press apparatus where it was compressed and heated to harden the adhesive. When producing a thick product, it is necessary to conduct the thermocompression for a long time in order for the heat to be transmitted into the workpiece. This time of thermocompression is directly associated with the production time, so that long thermocompression times make mass production difficult, and the unit price of the product rises.

In order to address these problems and to shorten the heating press time, a steam injection pressing method has been used. A heating press for use with this method has a number of fine jetting holes 2a perforating the respective press faces of an upper heat plate 1 and a lower heat plate 2, as shown in FIG. 6. Steam pipes 3, disposed on the heat plates 1 and 2, are communicated and connected to the fine jetting holes 2a of the respective press faces, and opening-closing valves 3a each comprising an electromagnetic valve are disposed on these steam pipes 3. The pressurized and compressed steam or gas transferred from the steam pipes 3 is jetted from the fine jetting holes 2a of the respective press faces, so that the workpiece 4 is heated by the steam or gas. Thereby, the whole workpiece reaches the hardening temperature of the adhesive near instantaneously, and the time of thermocompression is decreased and productivity can be improved. Particularly where the product is a chip-like or fiber-like workpiece of a particle board or a fiber board, since a number of void spaces exist in the workpiece, the jetted steam or heated gas penetrates into the workpiece easily, and its temperature can be increased rapidly.

However, in the above mentioned steam injection pressing method, there is a problem that where the workpiece comprises single plates, large-sized flakes or strands, or ligneous stalks, the jetted steam or heated gas has difficulty penetrating into the minute internal construction of the workpiece, so that the thermocompression time becomes longer.

That is, for products such as laminated veneer lumber (LVL) in which a plurality of the single plates are laminated and adhered, or a ligneous stalk board in which sheets each produced by arranging a plurality of ligneous stalks in parallel with each other are laminated, there is a problem in that the thermocompression time with steam or heated gas is practically equal to the thermocompression time by the prior heat plate. An advantage by the steam injection pressing method cannot be demonstrated sufficiently.

SUMMARY OF THE INVENTION

It is an object of the present invention to provide a method for forming an aggregation body by thermocompression, in which jetted steam or heated gas penetrates easily into the workpiece to shorten the thermocompression time, thereby improving productivity, particularly in case of workpieces having minute internal construction.

In order to attain the above mentioned object, a method for forming an aggregation body by thermocompression, as shown in FIGS. 1 to 3, is characterized by the steps of inserting a workpiece 11 comprising an aggregation body between an upper heat plate 12 and a lower heat plate 13 of a heating press apparatus 10, arranging a spacer 14 for determining a working thickness of the workpiece 11 before or after inserting the workpiece 11, around the workpiece 11, compressing the workpiece 11 by the upper heat plate 12 and the lower heat plate 13 to thereby form an air tight space by the upper heat plate 12, the lower heat plate 13 and the spacer 14, decompressing the air tight space during a predetermined period, and jetting a steam or a heated gas onto the workpiece 11 in the decompressed air tight space.

As described above, according to the present invention, increases penetration of the steam or the heated gas into the workpiece and therefore faster heating of the center portion of the workpiece is obtained by decompressing the airtight compartment containing the workpiece for a short time, jetting the steam or the heated gas into the airtight space. Therefore, the thermocompression time of the workpiece can be shortened extremely, and the productivity can be improved.

This advantage can be obtained whether the steam jetting ports are disposed on a spacer; or on a heat plate and even with workpieces such as plant stalk board, laminated veneer lumber (LVL), or other woody boards such as zepher board, OSB (Oriented Strand Board), flake board, particle board or fiber board.

DESCRIPTION OF THE PREFERRED EMBODIMENTS

In an embodiment of the present invention, a workpiece comprising an aggregation body is inserted between an upper heat plate and a lower heat plate of a heating press apparatus. It is preferable that the aggregation body workpiece comprises woody single plates for thermocompressing into a plywood or a laminated veneer lumber (LVL), sheets obtained by rolling a thin log referred to as a zepher wood to opening fibers in them for laminating by thermocompression, fine flake-like chips for thermocompressing into a laminate such as a Parallam board, flake-like or a strand-like wood chips or woody small chips for thermocompressing into a flake board or a strand-like board, or woody small chips or fibers and the like for thermocompressing into a particle board or a fiber board. The work piece in the present invention may also comprise of at least one kind of ligneous materials in an aggregation of single plates, sheet-like articles in which fibers are opened by a rolling, stick-like articles formed by finely tearing off a single plate, flake-like articles and strand-like articles.

Figure 1:
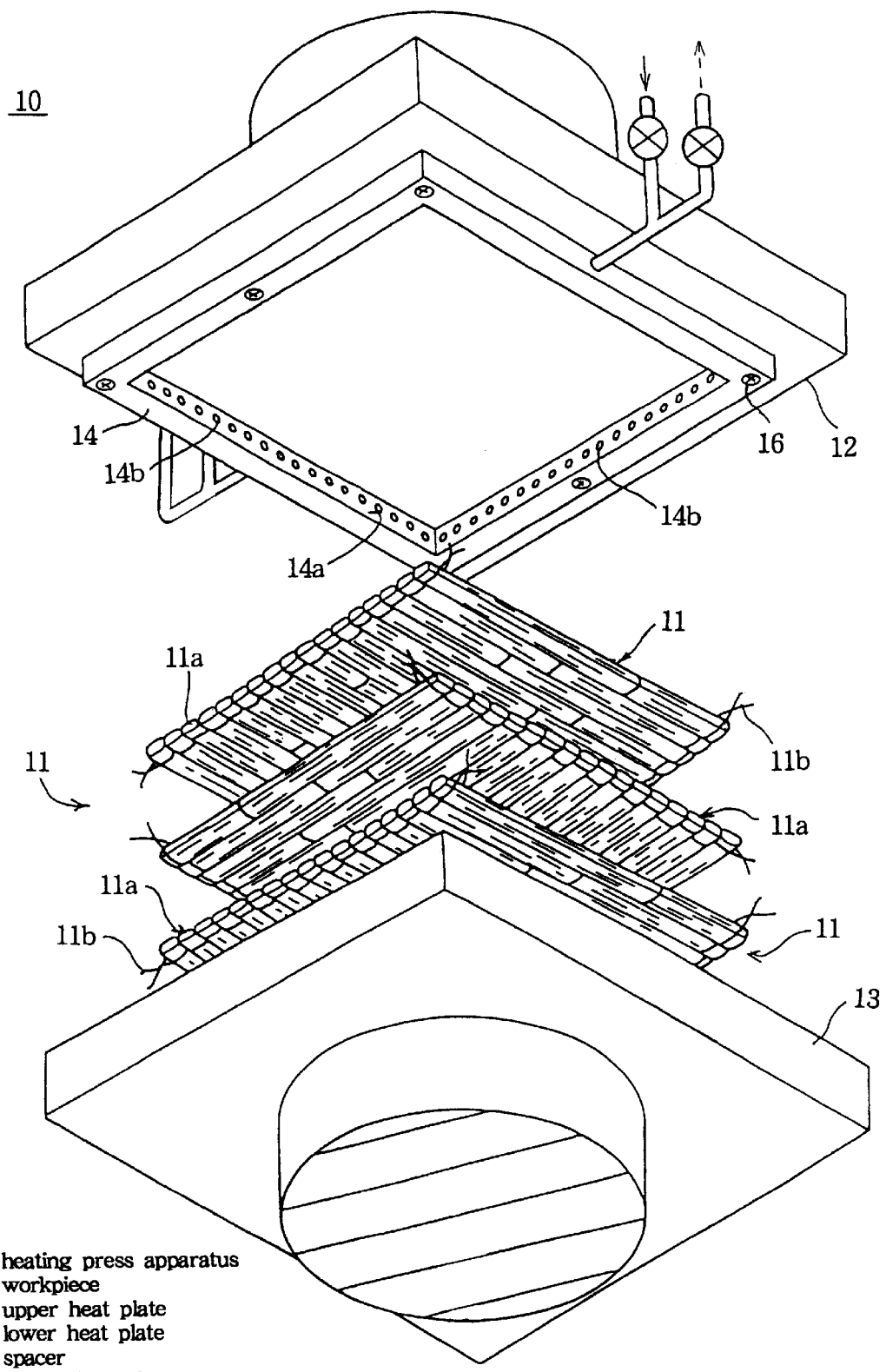
FIG. 1 is a perspective view of a heating press apparatus for executing the method of the present invention.

As an example of a heating press for executing the method of the present invention, is shown in FIG. 1 as apparatus 10. The workpiece in the present invention may be a sheetlike article 11 in which a plurality of ligneous stalks 11a with lignocellulose as a main body are arranged in parallel with each other. The sheet-like article 11 is one in which a plurality of the compressed ligneous stalks 11a are knitted to form a reed screen by strings 11b. The ligneous stalk board which is the product is produced by overlapping a plurality of the sheet-like articles 11 with each other while coating an adhesive on the sheet-like articles 11. In a case where the laminated body is produced from the sheet-like articles 11, it is preferable that a plurality of sheet-like articles 11 are laminated in such a manner that the ligneous stalks 11a of each sheet are perpendicular to the stalks of neighboring sheets, as shown in FIG. 1, thereby ensuring the final product a uniform bending strength in all directions and preventing.

Usually, the spacer for determining a working thickness of the workpiece is arranged after insertion of the workpiece into the apparatus. However, the spacer may be attached to the upper and/or lower heat plates before inserting the workpiece. If the spacer fixed to one of the heating plates, the working time can be shortened compared with the case in which the spacer is attached thereto after the insertion of each workpiece.

When the workpiece is compressed strongly, the composition becomes intimate, the voids in the workpiece are decreased, and the penetrating of the steam or the gas into the workpiece is lowered extremely. Most common thermocompressed laminate products are 15 mm thick or less. Where a product of more than 15 mm in thickness was desired, the previous method involved first preparing the product of thin laminated material and the like, and then laminating again a plurality of the thin laminated layers. Using the thermocompression method of the present invention, a product of more than 15 mm in thickness can be laminated in one thermocompression, improving production efficiency remarkably. However, where a laminated material of more than 200 mm in thickness is desired, the thickness of the aggregation body (workpiece) before thermocompression becomes too great. Unless the stroke distance of the heating press is enlarged, the thermocompression is difficult to carry out, the volume of the heating press is enlarged inevitably, and then the cost of equipment is increased. Accordingly, it is desirable that the thickness of the workpiece is less than about 200 mm.

In a case where the arranging of the spacer is carried out before the workpiece is inserted into the apparatus, it is preferable that the spacer is previously attached to an upper heat plate, a lower heat plate, a press face of either of the upper or lower heat plates, or the press faces of both of them. For example, the heating press apparatus 10 has spacer 14 attached to the upper heat plate 12 as shown in FIG. 1. In this example, the lower heat plate 13 has a fixed position, and the upper heat plate 12 is adapted to move upwardly and downwardly so as to press the sheet-like workpiece 11 arranged between the two heat plates. The spacer 14 determines the thickness of the product after the thermocompression and, in this example, is formed into a rectangular frame-like body surrounding and corresponding to the external for of the rectangular sheet-like workpiece. Screw holes (not shown) are disposed at predetermined places on the upper heat plate 12, and the spacer 14 is attached thereto by six screws 16. The spacer 14 is adapted to hermetically seal the workpiece in a compartment formed in conjunction with the upper heat plate 12 and the lower heat plate 13 in an compressed state. The shape of the spacer 14 is not limited to the rectangular frame shown in FIG. 1, but should be adapted to the shape of the workpiece to be used. For example, if the external shape of the workpiece is a polygon, the spacer is made to correspond to that shape.

Figure 2:
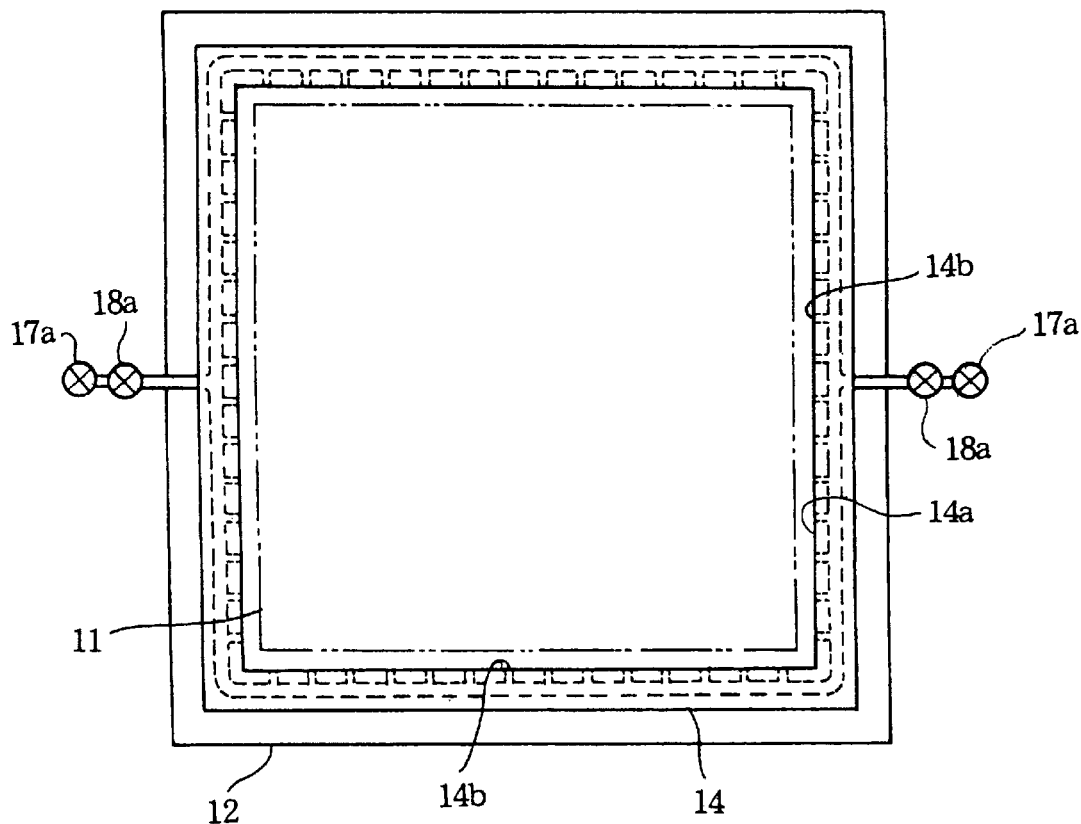
FIG. 2 is a plane view of an upper heat plate of the heating press apparatus of FIG. 1.

After the workpiece and the spacer are arranged in the apparatus, the workpiece is compressed by the upper heat plate and the lower heat plate and a hermetically sealed compartment containing the workpiece is formed by the upper heat plate, the lower heat plate and the spacer. This hermetically sealed space is then decompressed for a predetermined period. In the heating press apparatus 10 shown in FIG. 1, this decompression is achieved through a plurality of holes 14b which are disposed on an inner face 14a of the spacer 14 opposed to the workpiece in a row. As shown in FIG. 2 in detail, a number of holes 14b are arranged on four inner faces 14a of the rectangular frame-like spacer 14 at regular intervals in parallel with the press face of the upper heat plate 12. The holes 14b are connected to each other inside of the spacer 14 as shown by dotted lines and then communicate with a suction gas pipe 17 and a steam pipe 18 disposed on an outer face of the spacer 14. The suction gas pipe 17 and the steam pipe 18 are provided with opening-closing valves 17a, 18a respectively. Preferably, these valves are electromagnetic valves. The suction gas pipe 17 is connected with a decompressing apparatus such as a water ejector (not shown), which is operated by opening the opening-closing valve 17a, so that air is sucked from the holes 14b thereby decompressing the hermetically sealed space. The decompression may also be carried out through the jetting holes disposed on a conventional heat plate.

The decompression is carried out to a compartment air pressure of not greater than the atmospheric pressure, preferably not greater than 400 mmHg, further preferably not greater than 500 mmHg while the decompressing time is selected from 10 seconds to 10 minutes according to the thickness and nature of the workpiece.

Figure 3:
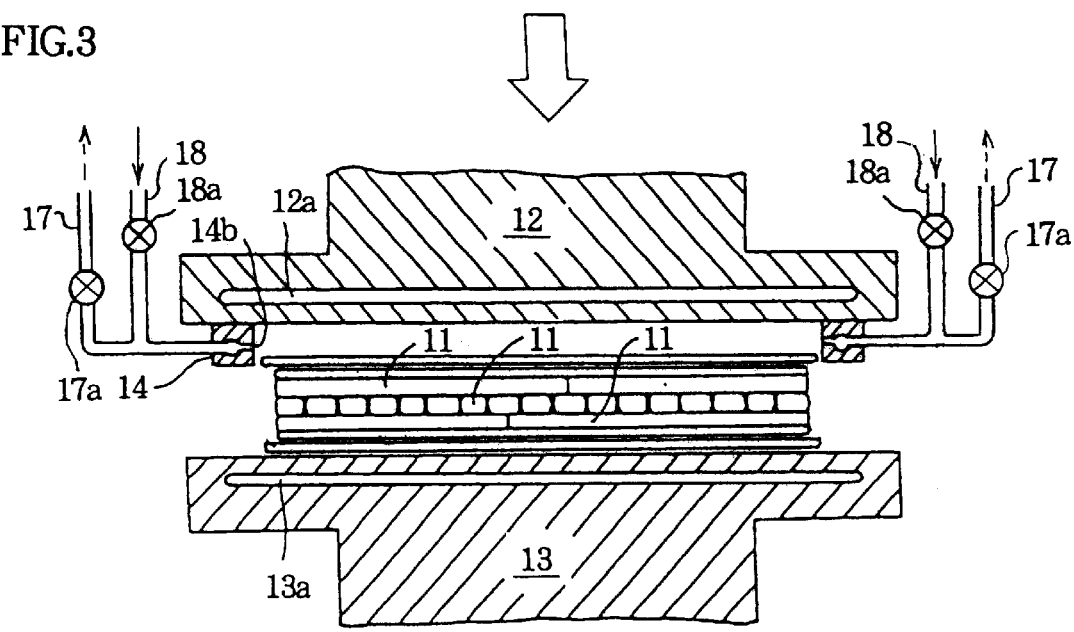
FIG. 3 is a sectional view of the heating press apparatus of FIG. 1.

After the completion of the decompression, steam or gas of a temperature of 50° C. to 250° C. and a pressure of 2 to 60 kg/cm$^2$ is jetted into the compartment thereby carrying out the thermocompression. In this case, it is preferable that the temperature of the heat plate is previously set at the high temperature of the steam or gas jetted into the compartment from the holes. The jetting time is selected from a range of several seconds to several tens of minutes according to the thickness and nature of the workpiece. For example, in the heating press apparatus 10 shown in FIG. 1, and further detailed in FIG. 3, the steam pipes 12a, 13a for heating the heat plates 12, 13 are disposed in the heat plates 12, 13 so as to meander, although it is not shown in the drawing. Also, an inlet valve and an outlet valve (not shown) each comprising an electromagnetic valve are disposed on the steam pipes 12a, 13a, and the heating temperature of the heat plates 12, 13 can be adjusted by introducing the heated steam to the steam pipes 12a, 13a or shutting them off. The opening-closing valve 17a of the electromagnetic valve disposed on the suction gas pipe 17 is closed at a pressurized state, and the opening-closing valve 18a of the electromagnetic valve disposed on the steam pipe 18 is opened, so that the pressurized and heated steam is jetted from the holes 14b disposed on the spacer 14.

The jetted steam penetrates into the workpiece and transmits heat energy similarly to the conventional steam injection pressing method, thereby bringing the whole workpiece to a predetermined temperature nearly instantaneously. After this heated and compressed state is maintained for a predetermined period, in the heating press apparatus 10 of FIG. 1, the opening-closing valve 18a is closed, stopping the entry of steam into the compartment through the holes 14b, and then the upper heat plate 12 ascends, thereby completing the thermocompression process.

Moreover, in a case where the temperature increase inside the aggregation body is low even if the pressurized and heated steam or gas is jetted after the above mentioned hermetically sealed space is decompressed once, the aggregation body is thermocompressed by ensuring the decompression again after the jetting of the steam or the heated gas, so that another application of steam or heated gas can penetrate into the workpiece further.

Examples according to the present invention will be described hereinafter together with comparative examples.

EXAMPLE 1

A laminated veneer lumber (LVL) is produced from seven South-Sea timber single plates, each of 3 mm in thickness and up to 10% water content, are piled up so as to be in parallel with each other in fiber direction. Both faces of the single plates of even numbered layers are previously coated with an adhesive paste comprising 100 weight parts of phenolic resin adhesive (made by Ohshika Shinko Co, Ltd SHINKOBOND D-17) mixed with 20 weight parts of wheat flour, at the rate of 200 g/m² per one adhere layer. The seven layered workpiece is inserted into the heating press apparatus which is maintained at 150° C. Immediately, a spacer of 20 mm in thickness having a plurality of steam jetting holes is arranged around the laminated single plates, then the thermocompression is started.

When the spacer and the upper and lower heat plate are brought together to form a hermetically sealed compartment containing the laminated single plates of seven layers, the water ejector is immediately operated, so that the space is decompressed for 60 seconds. After 60 seconds has elapsed, steam which is maintained at about 5 kg/cm² in pressure is jetted into the compartment from the spacer holes for 8 minutes. After that, the inside of the compartment is returned to atmospheric pressure again, followed by another 60 second decompression and 4 minutes of steam. Finally, the finished product is taken out of the heating press apparatus.

In this thermocompression operation, the temperature change of a center portion of the laminated layer which is farthest from the heat plates was measured by a thermocouple. The result thereof is shown by the solid line in FIG. 4.

COMPARATIVE EXAMPLE 1

A laminated workpiece of seven layers similar to that of Example 1 is inserted into the heating press apparatus. The spacer of 20 mm in thickness having steam jetting holes is arranged around the workpiece, the compartment in which the laminated body is disposed is hermetically sealed, and simultaneously the steam which is maintained at about 5 kg/cm² is blown there into for 15 minutes. The temperature change was measured as in Example 1, and the result thereof is shown by the dotted line in FIG. 4.

EXAMPLE 2

Kaoliang stalks into which phenolic resin is impregnated by about 20% are arranged in parallel with each other to be made into a reed screen while fixing the stalks by strings. Then the reed screens are piled up in seven layers in such a manner that the stalks constituting the reed screen are perpendicular to each other while being coated with an adhesive composition prepared by mixing homogeneously an isocyanate system adhesive (made by Koyo Sangyo Co, Ltd, KRF-46) of 100 weight parts, a cross-linking agent (made by Koyo Sangyo Co., Ltd., Am) in 50 weight parts, wheat flour in 15 weight parts, and water in 10 weight parts. The amount of the adhesive composition to be coated is 200 g/m² per one adhering layer. Next, radiate pine single plates of 1.8 mm in thickness are superposed on both sides of the piled seven layers and the entire pile is placed in the heating press apparatus which is maintained previously at a temperature of about 150° C.

Immediately, a spacer of 30 mm in thickness having a plurality of steam jetting holes is placed around the workpiece, then the thermocompression is started.

When the spacer and the heat plates are contacted to each other and the compartment containing the workpiece is hermetically sealed, the water ejector is immediately operated, so that the space is decompressed for 60 seconds. After 60 second has elapsed, steam which is maintained at about 5 kg/cm² in pressure is jetted into the compartment from the spacer holes for 5 minutes. After that, the inside of the compartment is returned to atmospheric pressure again, followed by another 60 second decompression and 3 minutes of steam. Finally, the finished product is taken out of the heating press apparatus.

In this thermocompression operation, the temperature change of a center portion of the laminated layer which is farthest from the heat plates was measured by a thermocouple. The result thereof is shown by the solid line in FIG. 5.

COMPARATIVE EXAMPLE 2

A workpiece similar to that of Example 2 is inserted into the heating press apparatus. The spacer of 30 mm in thickness having steam jetting holes is arranged around the workpiece, the compartment in which the laminated body is disposed is hermetically sealed, simultaneously the steam which is maintained at about 5 kg/cm² is blown thereinto for 12 minutes. The temperature change was measured as in Example 1, and the result thereof is shown by the dotted line in FIG. 5.

EVALUATION

Figure 4:
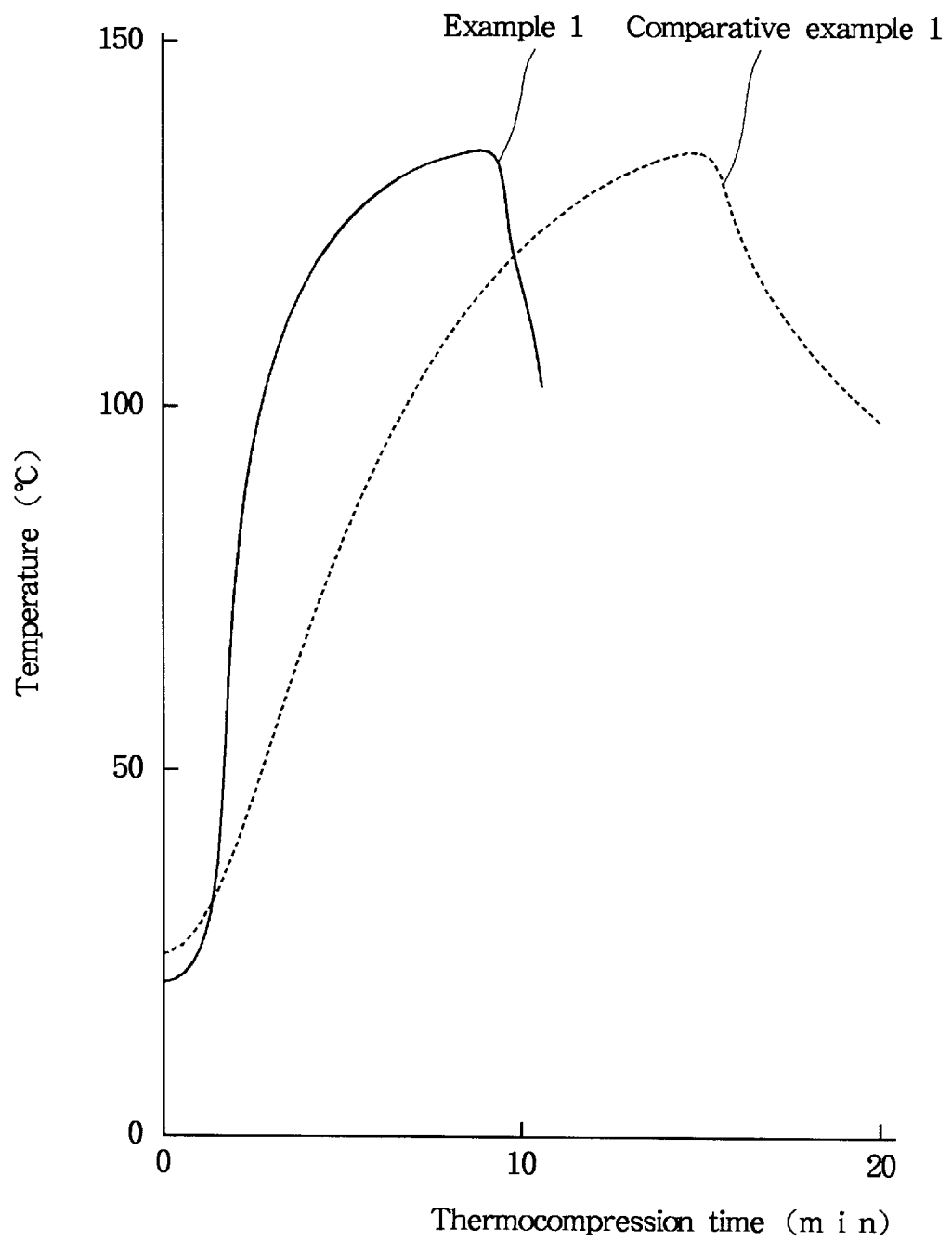
FIG. 4 is a graph comparing temperature changes of a laminated veneer lumber (LVL) workpiece after thermocompression according to either Example 1 or Comparative Example 1.
Figure 5:
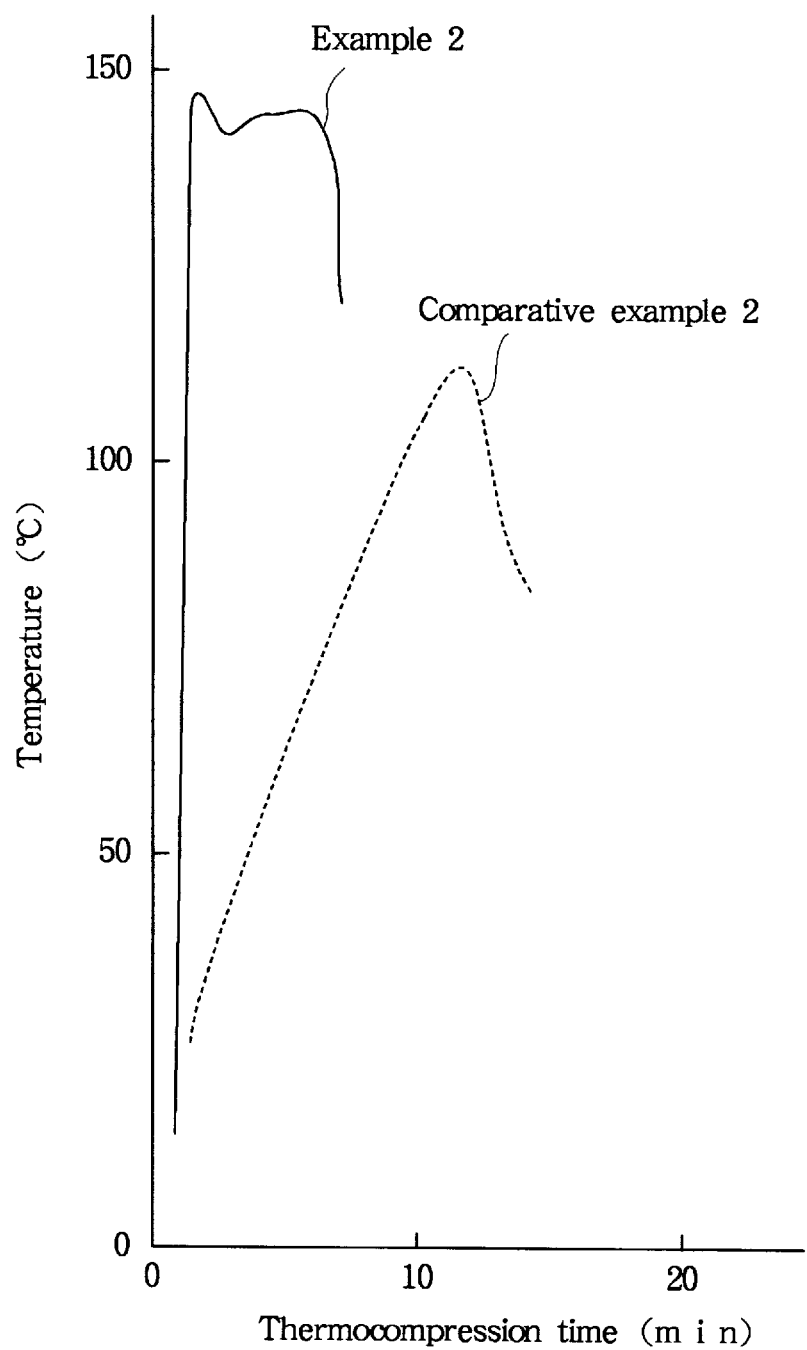
FIG. 5 is a graph comparing temperature changes of a sheet-like workpiece of a kaoliang stalk after thermocompression according to either Example or Comparative Example 2.
Figure 6:
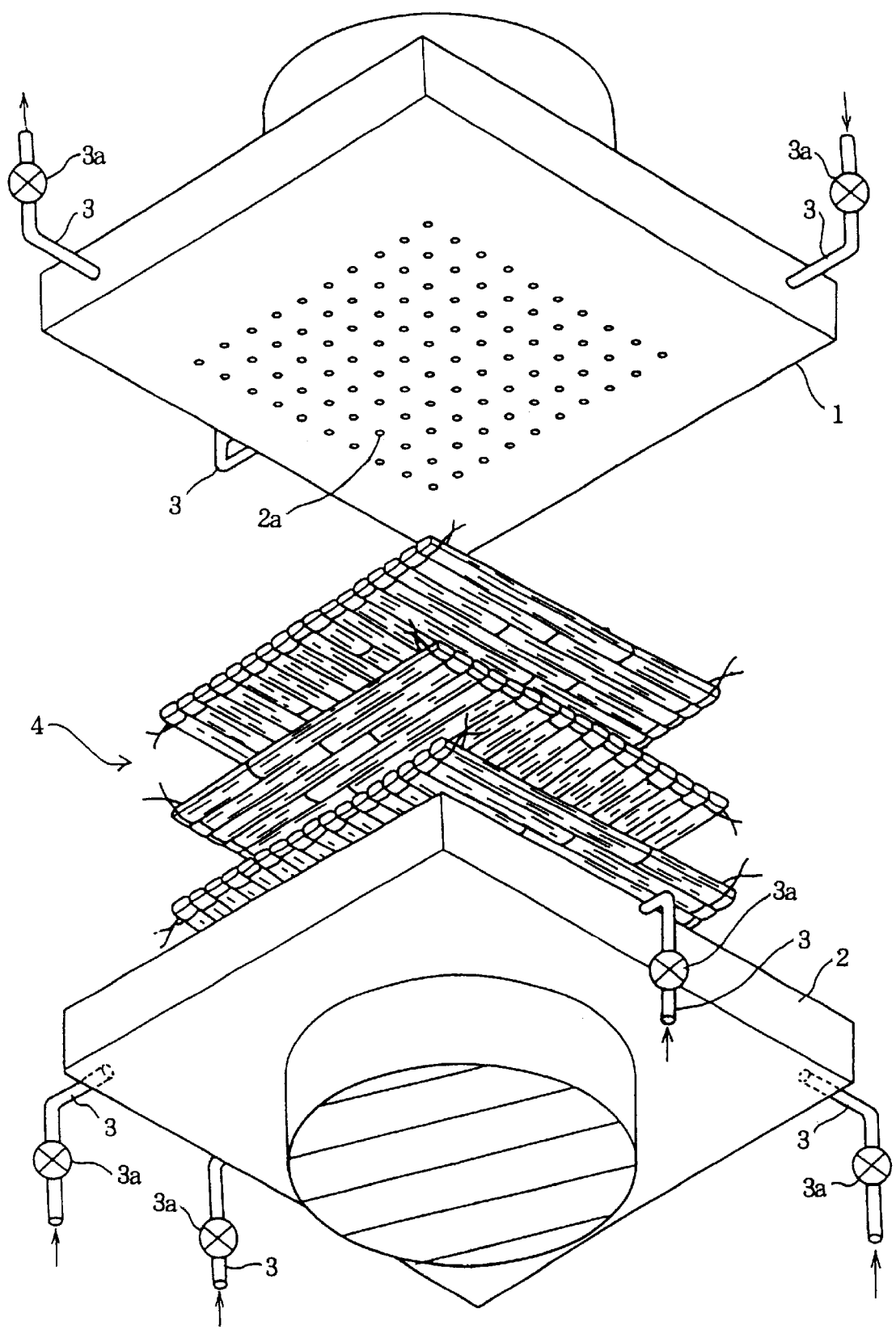
FIG. 6 is a perspective view of a conventional heating press apparatus.

It is apparent from FIG. 4 and FIG. 5, that a shorter thermocompression time is needed to increase the core temperature of the workpiece in Examples 1 and 2 in which the hermetically sealed compartment is decompressed before the addition of steam, compared with the Comparative Examples 1 and 2 which are not decompressed.

What is claimed is:

1. A method for forming an aggregation body by thermocompression, comprising the steps of:
   a) inserting a workpiece comprising a woody material and an adhesive between upper and lower heated plates of a heating press apparatus;
   b) surrounding the workpiece with a spacer having a thickness equal to that of the desired aggregation body;
   c) moving the heated plates together to form an airtight compartment containing the workpiece, the compartment being defined by the upper and lower heated plates and the spacer therebetween;
   d) reducing gas pressure in the airtight compartment by evacuating gas therefrom; and
   e) after step d), supplying steam or heated gas to the interior of the compartment to harden the adhesive.

2. The method for forming an aggregation body by thermocompression according to claim 1, wherein the woody material is selected from the group consisting of single plates, sheet-like articles in which fibers are opened by a rolling, stick-like articles formed by fine tearing from a single plate, flake-like articles and strand-like articles.

3. The method for forming an aggregation body by thermocompression according to claim 1, wherein the woody material is a ligneous stalk mainly composed of lignocellulose.

4. The method of claim 1, further comprising the step of evacuating by the airtight compartment after supplying the steam or heated gas thereto.

5. The method of claim 1, wherein in step d), the gas pressure inside the compartment is reduced to less than 500 mmHg.

6. The method of claim 1, wherein the gas pressure inside the compartment is reduced to less than 500 mm Hg.

7. The method of claim 1, wherein the gas pressure inside the compartment is reduced to less than 400 mm Hg.

8. The method of claim 1, wherein the steam or gas has a temperature of from 50° to 250° C. or a pressure of 2 to 60 kg/cm$^2$.

* * * * *